United States Patent

Benz et al.

[11] Patent Number: 5,658,449
[45] Date of Patent: Aug. 19, 1997

[54] METHOD AND DEVICE FOR CATALYTIC NITROGEN OXIDE REDUCTION OF MOTOR VEHICLE EXHAUST

[75] Inventors: Uwe Benz, Uhldingen; Ottmar Schmid, Markdorf, both of Germany

[73] Assignee: Dornier GmbH, Friedrichshafen, Germany

[21] Appl. No.: 586,004

[22] Filed: Jan. 16, 1996

[30] Foreign Application Priority Data

Jan. 13, 1995 [DE] Germany ............ 195 00 788.3

[51] Int. Cl.$^6$ ........................................... C02F 1/46
[52] U.S. Cl. .................. 205/637; 205/628; 205/763; 204/252; 204/266; 204/278
[58] Field of Search .................. 205/637, 628, 205/763; 204/252, 266, 278

[56] References Cited

U.S. PATENT DOCUMENTS

| 5,023,063 | 6/1991 | Stiles | 423/239 |
| 5,176,809 | 1/1993 | Simuni | 205/637 |
| 5,352,337 | 10/1994 | Kobayashi et al. | 204/59 R |
| 5,399,251 | 3/1995 | Nakamats | 205/628 |

FOREIGN PATENT DOCUMENTS

| 0 147 751 | 7/1985 | European Pat. Off. . |
| 0 537 968 | 4/1993 | European Pat. Off. . |
| 0 566 071 | 10/1993 | European Pat. Off. . |
| 42 30 408 | 3/1993 | Germany . |
| 42 37 184 | 3/1993 | Germany . |
| 195 44 585.6 | 9/1995 | Germany . |
| 195 35 212.2 | 11/1995 | Germany . |

*Primary Examiner*—Arun S. Phasge
*Attorney, Agent, or Firm*—Evenson, McKeown, Edwards & Lenahan, P.L.L.C.

[57] ABSTRACT

A method and a device for NO reduction of exhaust in motor vehicles by reduction on a catalyst is provided. The hydrogen required for NO reduction is generated directly on board the motor vehicle by electrolysis with liquid fixed electrolyte.

16 Claims, 10 Drawing Sheets

FIG. 1

| FTP CYCLE | NO REDUCTION | | REQUIRED H2 GENERATION WITH STOICHIOMETRY 2.0 | ELECTRICAL POWER REQUIREMENT OF ELECTROLYZER (THERMAL EFFICIENCY = 80%) | WATER CONSUMPTION OF ELECTROLYZER |
|---|---|---|---|---|---|
| | g/mile | mol/km | | | |
| AVERAGE SPEED 34.1 km/h | 0.5 | 0.0105 | 0.716 mol/h | 70 W | 0.013 kg/h |
| MAXIMUM SPEED 92.2 km/h | 0.5 | 0.0105 | 1.936 mol/h | 190 W | 0.035 kg/h |

ELECTROLYZER SIZE (WITHOUT ADDITIONAL PARTS SUCH AS CONTAINER, ETC.)

| ELECTRICAL POWER REQUIREMENT | ELECTROLYZER VOLUME | ELECTROLYZER MASS |
|---|---|---|
| 70 W | 0.5 kg | 0.44 dm³ |
| 190 W | 0.9 kg | 0.8 dm³ |

METHOD AND DEVICE FOR CATALYTIC NITROGEN OXIDE REDUCTION OF MOTOR VEHICLE EXHAUST

BACKGROUND AND SUMMARY OF THE INVENTION

The invention relates to a method and a device for catalytic reduction of nitrogen oxides for mobile applications and, more particularly, to a method for reducing nitrogen oxides by reduction on a catalyst, with the hydrogen required for nitrogen reduction being generated aboard the motor vehicle by electrolysis.

For the operation of motor vehicles with gasoline and, especially, diesel engines, the observation of the applicable legal emission guidelines is indispensable. In this connection, catalytic $NO_x$ reduction using hydrogen is being used advantageously.

This catalytic removal of nitrogen oxides from the combustion exhaust from motor vehicles is performed using hydrogen on suitable catalysts with the reaction $$2NO + 2H_2 \rightarrow N_2 + 2H_2O.$$

In the known method for removing nitrogen oxides by $NO_x$ reduction, the hydrogen required for the reaction is carried in the vehicle, for example, in compressed gas tanks, liquid hydrogen tanks, or metal hydride storage devices. The disadvantage of this method is that large heavy containers are required to transport the hydrogen. These cumbersome containers also have a narrowly limited capacity, hence requiring short intervals between refills. In addition, the filling or replacement of $H_2$ tanks as well as the presence of such $H_2$ tanks poses a safety problem in and of itself.

A method for NO reduction of exhaust in a motor vehicle is known from European Patent document EP 0 566 071 A1, in which the required hydrogen is generated aboard the motor vehicle by electrolysis. Electrolysis is performed on an arrangement of electrodes between which a proton-conducting solid electrolyte is located. The anode consists of an oxidation catalyst and the cathode consists of a reduction catalyst. NO reduction takes place directly at the cathode with the participation of the hydrogen which penetrates the solid electrolyte.

One disadvantage of this known method is that the catalyst must be heated to a reaction temperature of at least 300° C. and is therefore not practical for gasoline and diesel engines, especially during the starting processes and in the partial load range. The exhaust temperatures in the partial load range decrease to about 100° C. at the point where the exhaust aftertreatment system is located within the motor vehicle. Therefore, systems that operate above approximately 100° C. require additional heating.

Another disadvantage of the known method is that the method has a low efficiency. The $H_2$ gas stream that is generated is less than 1 ml/min. In the vehicle, however, a $H_2$ gas stream of at least 0.2–0.7 l/min is required. If it were desired to use this method in a conventional diesel-powered vehicle, an electrode with a diameter of more than 1 meter (approximately 3 $m^2$ electrode surface) would be required.

German Patent document DE 42 30 408 A1 describes a method for NO reduction of exhaust in an internal combustion engine in which the required hydrogen is generated by electrolysis of water using a proton-conducting membrane.

This method has the following disadvantages: 1) under freezing conditions, additional heating of the electrolyzer is required to keep the membrane from being destroyed; 2) high requirements are imposed on the water quality (deionized water is required); and 3) the methodology is very expensive since the water can only be introduced through a circuit charged with water vapor.

There is therefore needed a method for $NO_x$ reduction using hydrogen in a motor vehicle in which compact, energy-efficient, mechanically loadable, and inexpensive hydrogen generation can be performed directly aboard the motor vehicle.

These needs are met according to the present invention by a method for reducing nitrogen oxides by reduction on a catalyst, with the hydrogen required for nitrogen reduction being generated aboard the motor vehicle by electrolysis. The electrolysis is performed using a liquid fixed electrolyte. These needs are further met by a device for reduction of nitrogen oxides in motor vehicle exhaust by catalytic reduction, including a reactor in which a catalyst is contained, on which nitrogen oxide reduction is performed with the addition of hydrogen, and at least one electrolyzer for generating hydrogen aboard the motor vehicle. The electrolyzer includes an electrolyte with a liquid fixed electrolyte.

According to the present invention, the hydrogen required for NO reduction is generated aboard the motor vehicle by electrolysis using a liquid fixed electrolyte. An alkaline electrolyte is preferably used for this purpose. This type of electrolysis is referred to in the following as LAE electrolysis (L=liquid, A=alkaline, E=electrolyte).

The generation of hydrogen aboard a motor vehicle with a fixed, especially an alkaline electrolyte, has the following advantages: 1) good suitability for cyclic operation; 2) only minor requirements are imposed on water quality; 3) the $H_2$ generator is suitable for operation in moving systems without additional devices such as, for example, separators; 4) low electrical power requirement due to the high efficiency; 5) the manufacture of the $H_2$ generator by mass production is inexpensive because of the simple manufacturing steps and the commercially available materials; 6) simple methodology; and 7) adaptation to the required geometry is readily possible.

The electrolysis of water is performed by the relationship $$H_2O + \text{electrical energy} \rightarrow H_2 + \tfrac{1}{2}O_2 + \text{heat}$$

in a plurality of electrolysis cells connected in parallel. The operation of the electrolyzer uses thermoneutral voltage, so that heat is produced as well. The electrical power required for generating hydrogen can be obtained from the alternator in the motor vehicle. In all, a maximum electrical power requirement of 190 W is needed for complete reduction of nitrogen oxides in today's automobile diesel engine exhaust. This peak power requirement however is sharply reduced by an electrolyzer gas-pressure reduction. The average electrical power requirement can be considerably lowered by the short response times of electrolysis by demand-oriented $H_2$ generation using an already existing accelerator potentiometer.

The relatively low water requirement is met by a separate water container. Advantageously, the water can also be supplied through the water-vapor-charged engine exhaust from the motor vehicle.

It is a further advantage of the present invention that separate tempering for the electrolyzer is not required. Heat exchange with the environment is sufficient because of the simple and flexible operating mode of the electrolyzer. The operating temperature range of the electrolyzer is between −25° C. and +95° C.

The electrolyzer can be operated at variable pressure, so that very rapid load changes are advantageously possible.

In one especially advantageous embodiment, the hydrogen, in addition to electrolysis using fixed liquid solid electrolyte, is also generated by water vapor reformation and/or partial oxidation of hydrocarbons, for example methanol, diesel fuel, or gasoline. Hydrogen generation by partial oxidation or reformation of hydrocarbons aboard a motor vehicle in and of itself is known from European Patent document EP 0 537 968 A1.

In this case, the device for generating hydrogen comprises, in addition to an electrolyzer with a liquid fixed solid electrolyte, a reactor for water vapor reformation and/or a reactor for partial oxidation of hydrocarbons. Such hybrid systems are especially advantageous for applications that have a high hydrogen requirement and require short response times for a cold start and load changes.

Other objects, advantages and novel features of the present invention will become apparent from the following detailed description of the invention when considered in conjunction with the accompanying drawings.

DETAILED DESCRIPTION OF THE DRAWINGS

Figure 1:
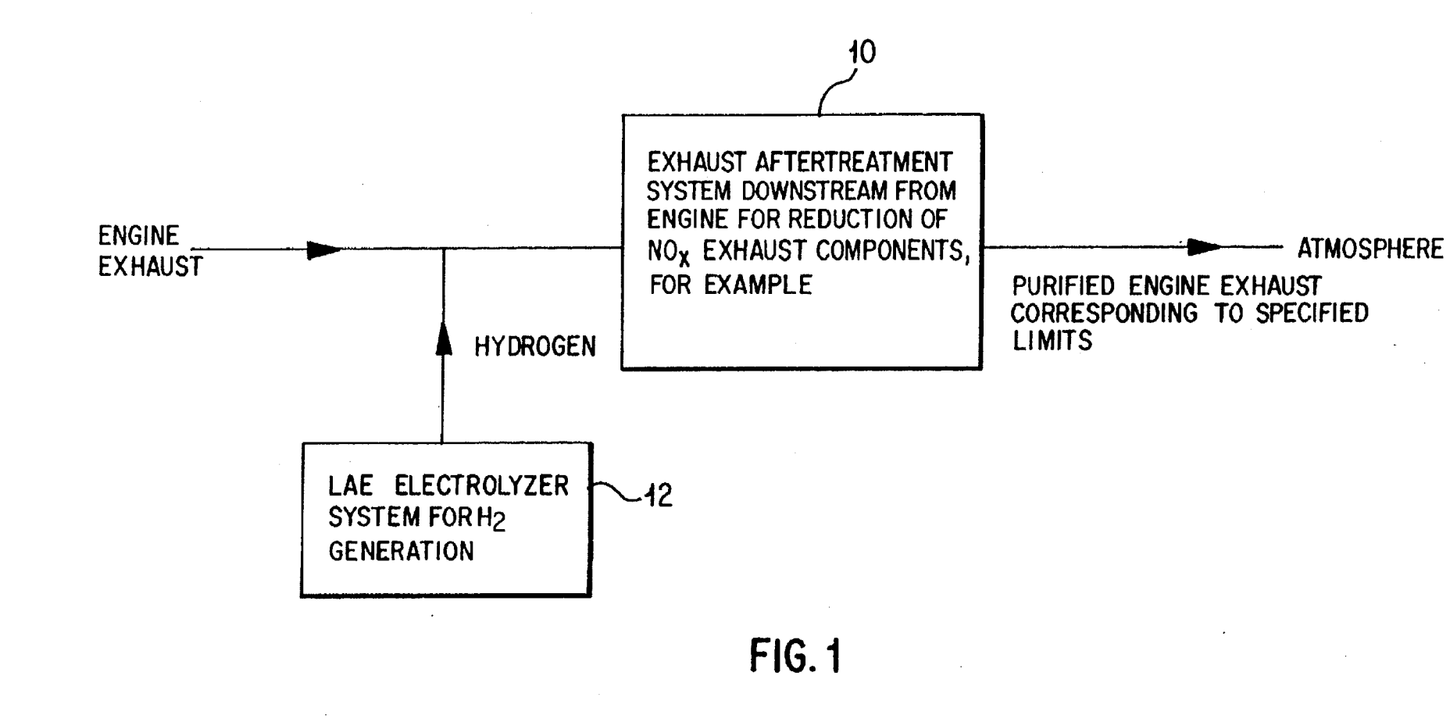
FIG. 1 is a basic schematic diagram of catalytic $NO_x$ reduction.

FIG. 1 shows the general diagram of the process for catalytic reduction of nitrogen oxides in engine exhaust. The engine exhaust is fed to an exhaust aftertreatment system 10 arranged downstream from the engine for reduction of $NO_x$ exhaust components. Likewise, hydrogen is also fed to the exhaust aftertreatment system from an LAE electrolyzer system 12 for $H_2$ generation. The purified engine exhaust corresponding to specified limits exits the aftertreatment system 10 into the atmosphere. The present invention thus relates to the generation of hydrogen, required for $NO_x$ reduction. According to the invention, the hydrogen is generated by electrolysis using fixed, preferably alkaline, electrolytes.

Figure 3:
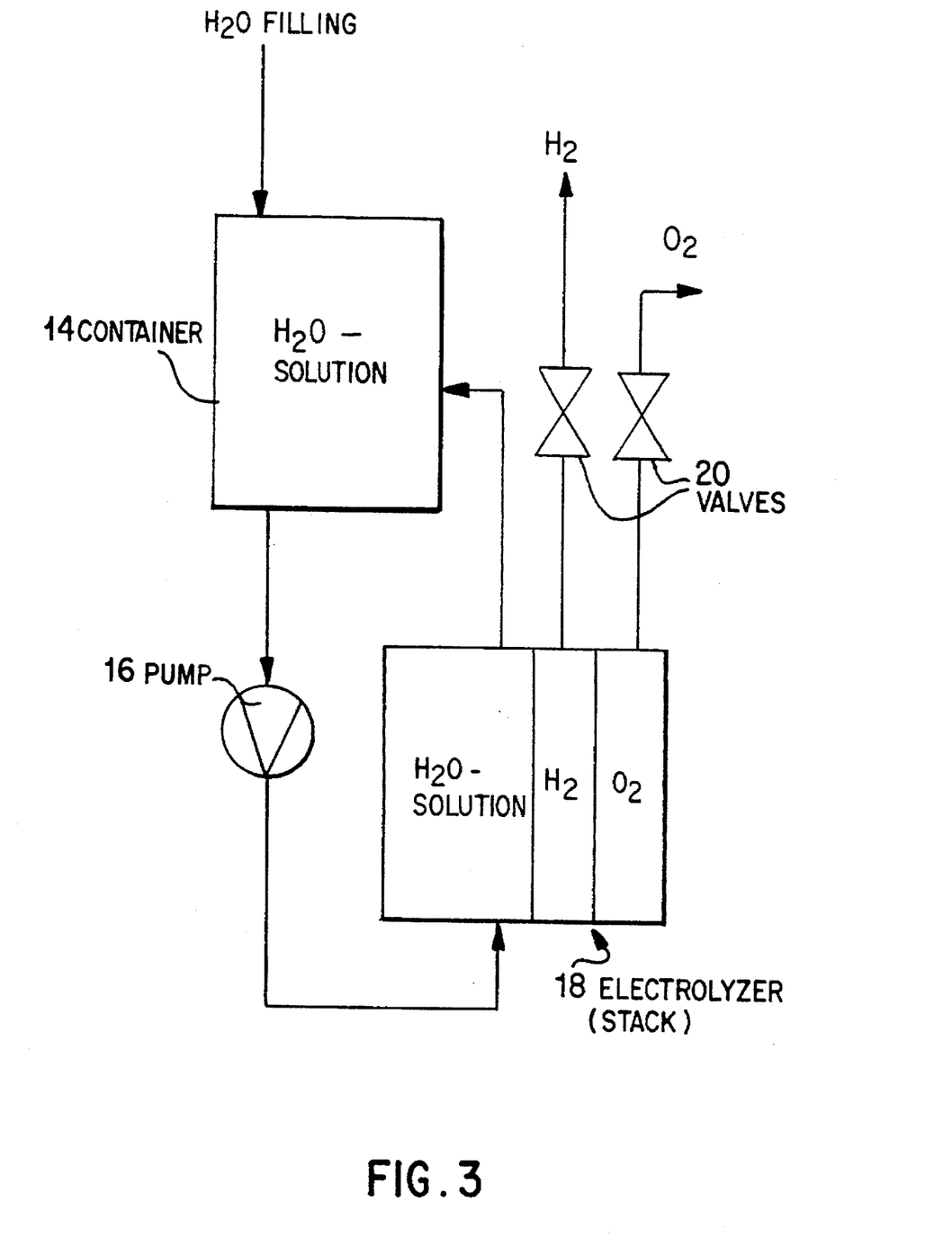
FIG. 3 shows a first embodiment for generating $H_2$ according to the invention using LAE electrolysis.
Figure 4:
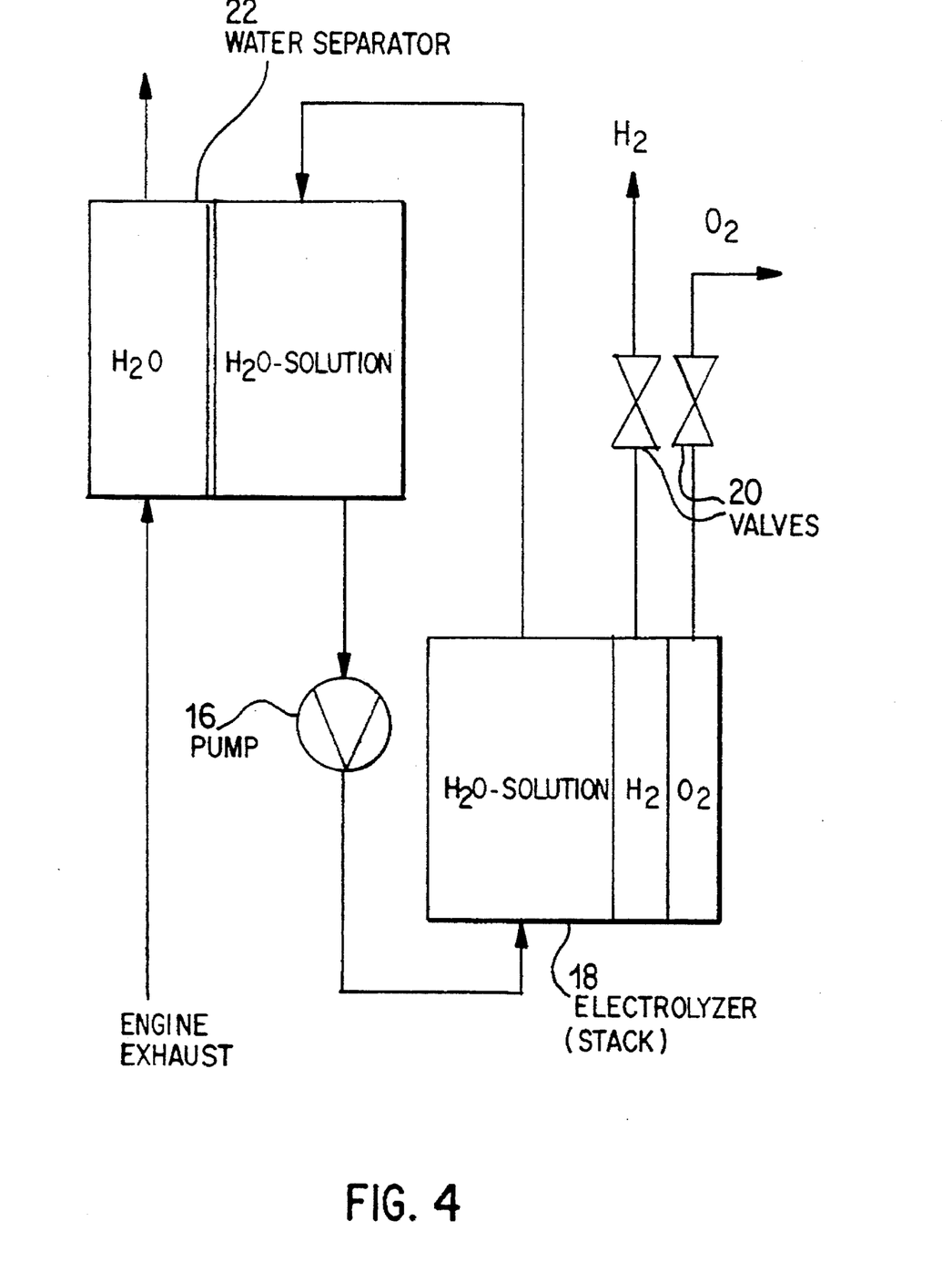
FIG. 4 shows a second embodiment for generating $H_2$ according to the invention using LAE electrolysis.
Figure 5:
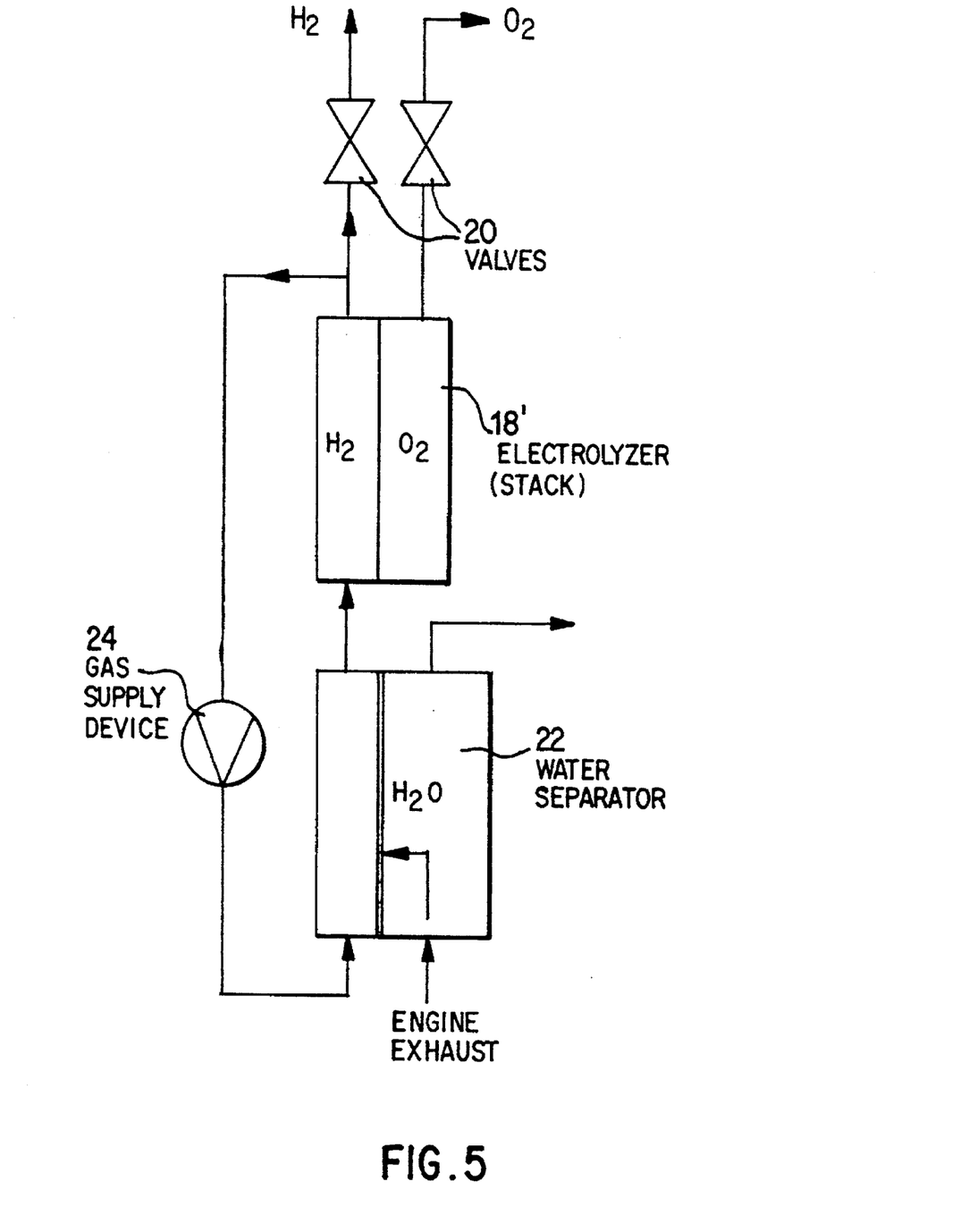
FIG. 5 shows a third embodiment for generating $H_2$ according to the invention using LAE electrolysis.

FIGS. 3–5 show various designs according to the present invention for generating $H_2$ by LAE electrolysis on board the vehicle. These embodiments meet the requirements imposed on the $H_2$ supply within the method shown in FIG. 1 for reaching the legally prescribed $NO_x$ limits.

The embodiments shown in FIGS. 3–5, in addition to the requirement relating to their suitability in motor vehicles, are also subject to the following boundary conditions: 1) reduction of the $NO_x$ components in diesel engine exhaust to between 0.7 g/mile and 0.2 g/mile; 2) the USA FTP75 test cycle is critical in the United States, with an average speed of 34.1 km/h and a maximum speed of 92.2 km/h; and 3) surplus of $H_2$ (stoichiometry) relative to NO of 2.0.

Figure 2:
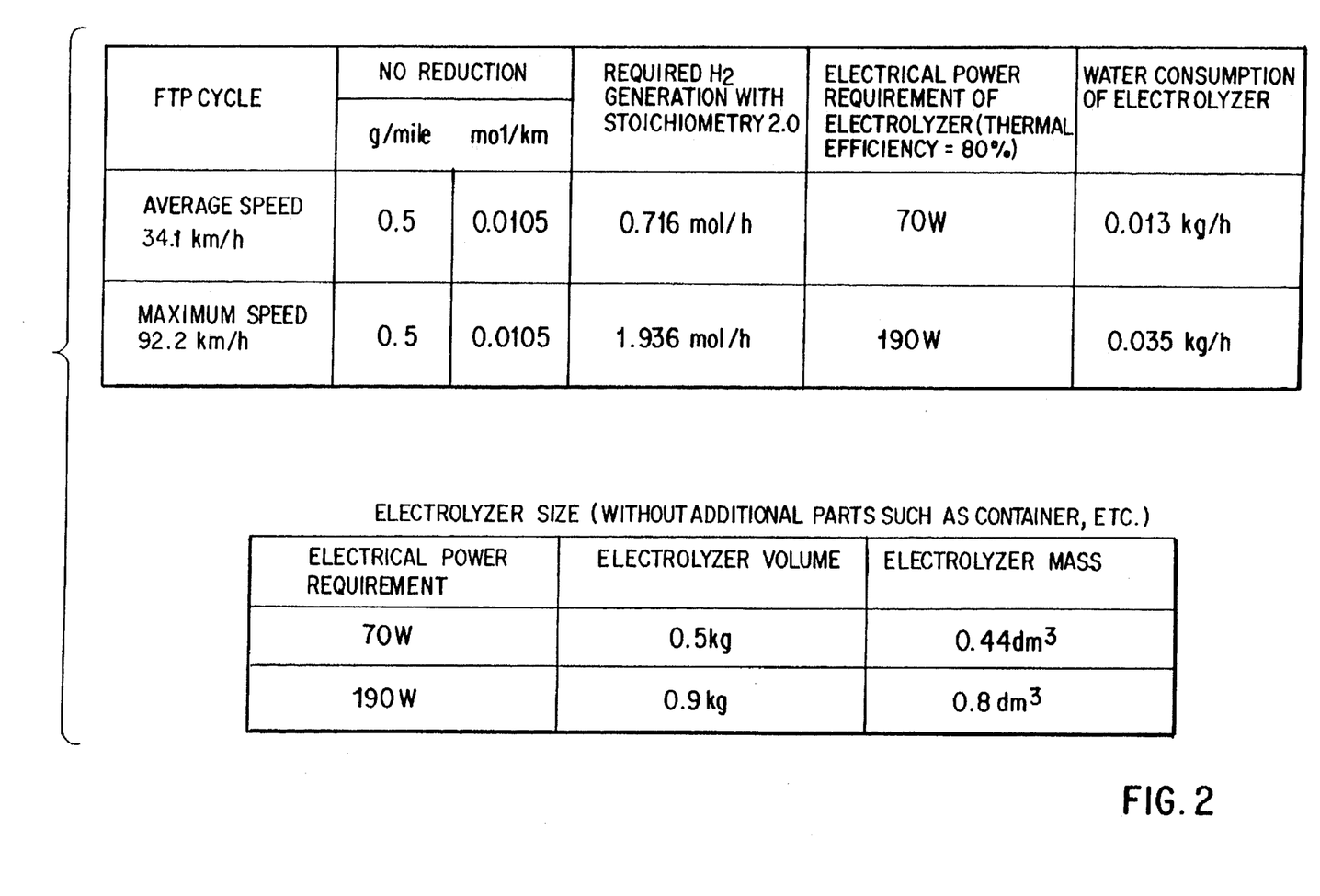
FIG. 2 is a table showing the electrical power requirement as well as water consumption and size of the electrolyzer.

On the basis of these boundary conditions, the values shown in the table of FIG. 2 are obtained for the electrical power requirement of the electrolyzer and the water consumption. Also shown are the values for the resultant dimensions of the electrolyzer. It should be noted in conjunction with the values in the table that they were calculated assuming 100% NO in the total value of $NO_x$. Since NO represents the dominant share in the total value of $NO_x$, this simplification is justified.

Figure 6:
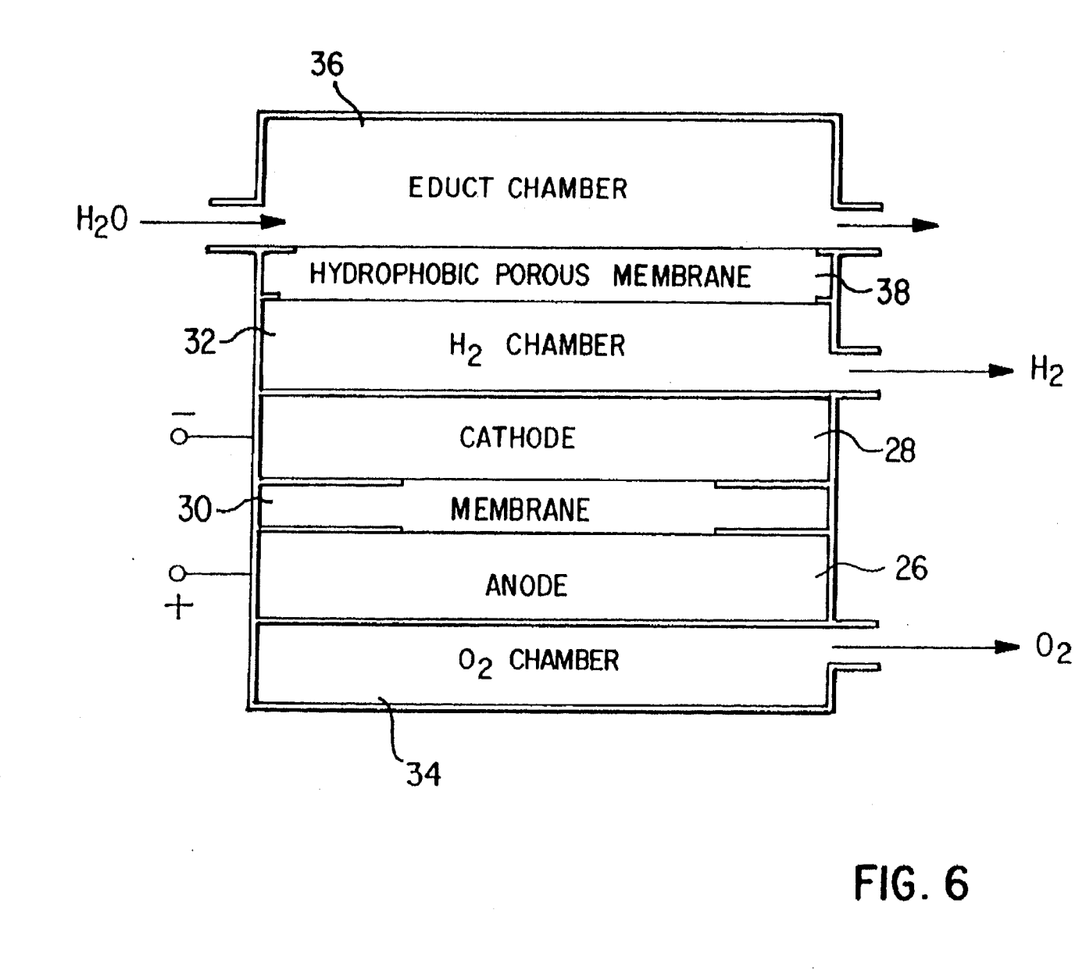
FIG. 6 shows a schematic diagram of an electrolyzer with a liquid fixed electrolyte.

The first embodiment shown in FIG. 3 includes a container 14 for storing the aqueous solution. The aqueous solution constitutes the educt for electrolysis. An aqueous solution of salts of inorganic and organic acids (acetates, phosphates, etc.) or mixtures of water with organic additives (glycols, urea, and glycerine for example) may, for example, be used. In addition, however, $H_2O$ can be used instead of an aqueous solution. The aqueous solution in the container 14 is delivered by a pump 16 to the LAE electrolyzer 18. The latter is shown only schematically here. Advantageously, it consists of a plurality of individual cells connected in series, assembled into a stack. An LAE electrolyzer cell as well as its operation are known of themselves. They are described for example in German Patent documents DE 195 35 212.2 and DE 195 44 585.6. An example of an LAE electrolysis cell is shown in FIG. 6. A valve 20 is mounted at the $O_2$ and $H_2$ outlets of the electrolyzer. The aqueous solution is guided in a circuit, namely from the container 14 through the electrolyzer stack 18 and back to the container 14. In this way, homogenization of the temperature as well as concentration of the aqueous solution can be ensured.

In order to compensate for the water losses that result during electrolysis, water can be supplied to the container at zero pressure. Water of tap water quality can be used for this purpose. However, the container must not be topped up until after concentration of the aqueous solution to the maximum permissible boundary value has taken place as a result of the water losses. The product gases generated by the electrolyzer, namely oxygen and hydrogen, are exhausted through the valves at corresponding pressures. These valves also prevent gases and liquids from flowing backward. The electrical power requirement can be met by the alternator in the vehicle. The average power requirement can be sharply decreased by demand-optimized control of the $H_2$ generation, for example, by parallel tapping of an existing signal at the potentiometer for the accelerator control of the motor vehicle. Especially with a lower $H_2$ requirement (for example in the version with a 70 W electrical power requirement for the electrolyzer) the delivery pump 16 can be eliminated. Homogenization of the temperature and concentration of the aqueous solution are ensured by the process-governed cell-internal heating of the electrolyzer. This heating causes a change in the density of the aqueous solution, hence resulting in mixing.

In the embodiment shown in FIG. 4, the water for electrolysis is taken from the water-vapor-loaded engine exhaust. As a result, there is no need for topping-off a container with water as in the embodiment shown in FIG. 3. A separator 22 is provided to separate the water from the engine exhaust. The water collected in the separator 22 is fed directly into the circuit for the aqueous solution, which constitutes the educt for the electrolysis. Otherwise, the design shown corresponds to the embodiment depicted in FIG. 3.

FIG. 5 shows another embodiment according to the invention for the on-board generation of hydrogen. In contrast to the two previous embodiments shown in FIGS. 3 and 4, it is not an aqueous solution that is used here, but rather water in the form of water vapor as an educt for electrolysis. The educt is supplied through an $H_2$ circuit which simultaneously serves for tempering the electrolysis cells in the electrolyzer. For this purpose, instead of a liquid pump, a gas delivery device 24 is required. The electrolyzer 18' is simplified since the chambers previously required for the aqueous solution are eliminated. Water is transferred by the separator 22 from the water-vapor-loaded engine exhaust to the $H_2$ circuit. During a cold start, the engine exhaust serves to heat the individual components as well. The $H_2$ gas is heated by the separator. The excess heat is discharged to the environment by free convection and the corresponding designs of the components.

FIG. 6 shows the schematic diagram of an individual LAE electrolysis cell, known in and of itself, as can be used advantageously in the method according to the present invention. It includes the following components. Electrodes 26, 28 are provided between which a porous membrane 30 is located. An electrolyte solution is fixed by capillary forces in the pores of the electrodes 26, 28 and membrane 30. A hydrogen product gas chamber ($H_2$) 32 adjoins the cathode 28. An oxygen product gas chamber ($O_2$) 34 adjoins the anode 26. An educt chamber 36, separated from the $H_2$ product gas chamber 32 by a hydrogen porous membrane 38, is provided for the educt, namely water or an aqueous solution.

The electrolysis process is initiated by imposing a DC voltage on the electrodes above the decomposition voltage of about 1.23 V (Faraday electrode reaction). The electrolysis gases are produced within the pores of the electrodes that are filled with the electrolyte, and pass into the adjacent gas chambers of the electrolysis cell. A suitable pore distribution on the electrodes prevents the electrolyte from being pushed out with the escaping electrolysis gases. This results in a phase separation between the electrolysis gases and the electrolyte within the electrodes, and there is no need for additional gas separators, as the electrolysis gases can then be used directly.

The electrolysis water supply for the electrodes 26, 28 comes from gas diffusion from the educt chamber 36 through the membrane 38 and the hydrogen chamber 32 to the electrolyte in the electrodes. The driving force for the water vapor diffusion is the differential between the water vapor partial pressures in the water reservoir and in the electrodes.

The membrane 38 between the water chamber and the gas chamber of the cathode prevents significant contamination of the electrodes with impurities in the water reservoir and results in a long lifetime for the electrodes. Both hydrophobic and hydrophilic membranes may be used (for example PTFE, PEEK, silicone, and polypropylene). Advantageously, a membrane system composed of two membrane layers is used, with one layer, facing the water, being hydrophilic and the other layer, facing the gas, being hydrophobic or impermeable.

The following may be used as electrolytes, for example, acids, bases, and metal salt solutions with high electrical conductivity, such as potassium hydroxide or other alkaline and alkaline earth hydroxides in concentrations of approximately 5–12 mol/liter; sulfuric acid at approximately 2–5 mol/liter; phosphoric acid, etc.

Advantageously the hydrogen required for catalytic $NO_x$ reduction is not generated exclusively by the LAE electrolysis described, but additionally by water vapor reformation and/or partial oxidation of hydrocarbons, for example methanol, diesel fuel, or gasoline. The additional components will now be described in greater detail with reference to examples:

Generation of Hydrogen by Reformation of Hydrocarbons.

Methanol is especially suitable for reformation of hydrocarbons. Diesel fuel or gasoline can also be used for reformation.

One advantageous reaction is water vapor reformation of methanol by the equation and partial oxidation of methanol by the equation The first reaction is endothermal and can be performed with the aid of catalysts that are known of themselves, for example catalysts with the active components copper and zinc at only 200°–400° C.

The second reaction is exothermal and is likewise performed with the support of catalysts that are known of themselves, for example Pt, Pd, Ru, or CuZnO.

In both reactions, depending on the operating mode of the reactors, CO is produced in the range from several hundred ppm to a few percent.

The processes of water vapor reformation and partial oxidation of other hydrocarbons are known of themselves and proceed according to comparable equations, but under different reaction conditions (mainly higher temperatures) and on other catalysts. In theory, however, the same statements as given below also apply to the special case of methanol for the performance of the process and reactor variations.

Figure 7:
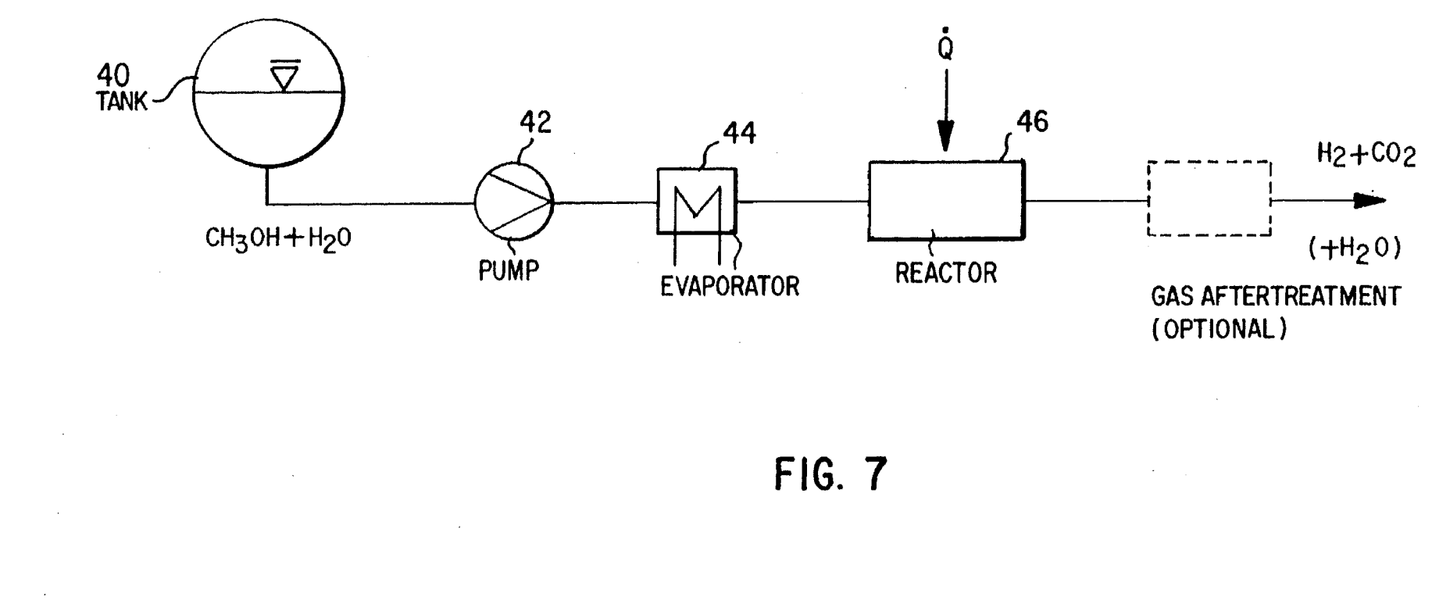
FIG. 7 is a schematic diagram showing $H_2$ generation by water vapor reformation from methanol.
Figure 8:
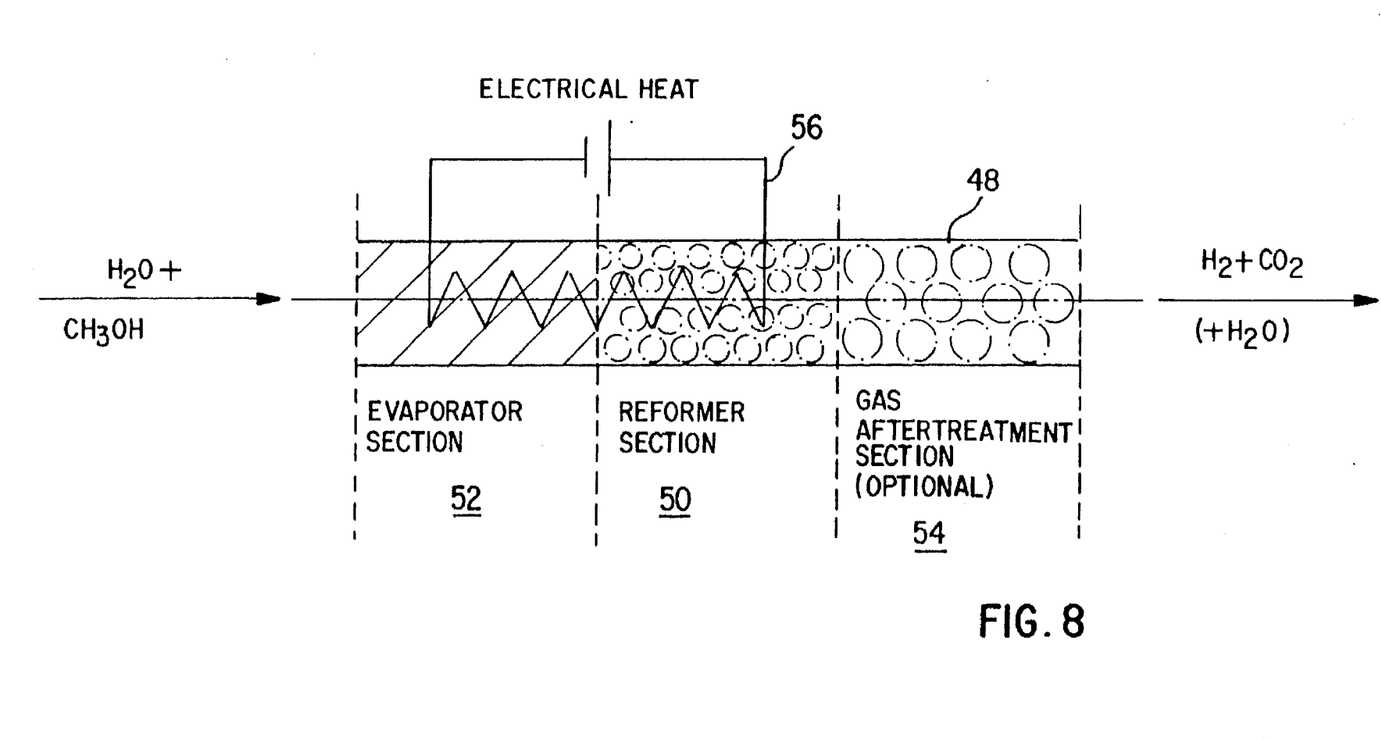
FIG. 8 shows a reactor for performing water vapor reformation from methanol.

Water Vapor Reformation from Methanol (FIGS. 7 and 8)

FIG. 7 shows the process of water vapor reformation from methanol. Initially, a water-methanol mixture is delivered from a tank 40, preferably with a molar ratio of methanol to water of 1:1 to 1:2. The tank can be under ambient pressure. Delivery is by means of a pump 42 that assumes the metering function directly as a function of the load through a suitable control (rpm regulation, for example). Alternatively, the liquids can be delivered through a constantly operating pump, with subsequent metering being performed for example by solenoid valves, operating comparably to the injection valves in a motor vehicle. Then, the water-methanol mixture is evaporated 44 in an evaporator and fed to the reactor 46. In the reactor, with the addition of heat to the catalyst, the conversion into hydrogen and $CO_2$ and $H_2$ takes place. Preferably, an electrical resistance heater can be used here as a heat source. The addition of heat to the reactor 46 can be adjusted for example by a temperature regulator in the catalyst. Possibly the CO component of the product gas can then be lowered in another reaction stage and/or the hydrogen yield can be increased, for example by means of the known shift reaction:

Instead of water and methanol being stored as a mixture in the same tank, the water and methanol can be stored separately from one another in different tanks and delivered from them.

FIG. 8 shows one advantageous embodiment of a reactor 46 for performing the water vapor reformation of hydrocar- bons. It is in the form of a tube 48, preferably with an inside diameter of 5 to 50 mm. The reactor is divided into three stages. In the center is the main reaction stage 50 in which a catalyst is located. This is where the water vapor reformation takes place. The catalyst is present in the form of loose material but monolithic materials can be used as well. An evaporator section 52 is located upstream from the main reaction stage 50, in which the water-methanol mixture is evaporated as it enters. An aftertreatment stage 54 is located downstream from the main reaction stage 50. This is where the CO that is produced is reduced by means of a shift reaction.

The figure also shows an electrical heater 56 by which the main reaction zone 50 is heated. In this case, the heater 56 is located in the reaction chamber 50 itself, but can also be located in the outer area of the tube 48. Alternatively, the heating of the reactor can also be performed by the hot exhaust from the internal combustion engine of the motor vehicle. In this case, the hot exhaust stream is guided over ribs (not shown) provided on the outside wall of the reactor.

FIG. 8 also shows that the evaporator stage 52 is also heated by the above-mentioned heating arrangement 56. However, embodiments are also possible in which the individual stages, including the aftertreatment stage, can be heated independently of one another. Thus, the evaporator stage in particular can be heated more strongly than the reformer stage (main reaction stage). The aftertreatment stage is heated only slightly if at all, so that the corresponding heating is not shown here.

Figure 9:
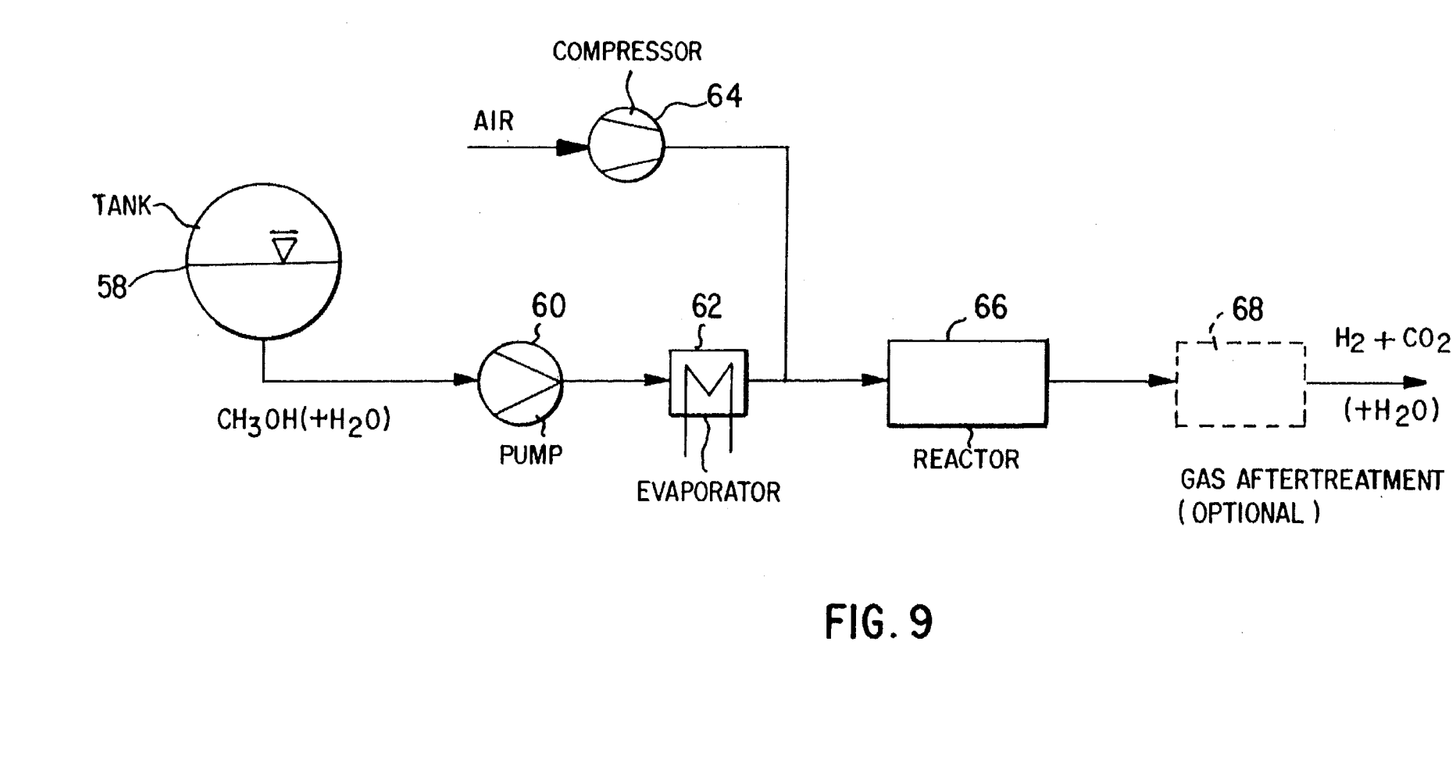
FIG. 9 is a schematic diagram showing $H_2$ generation by partial oxidation of methanol.
Figure 10:
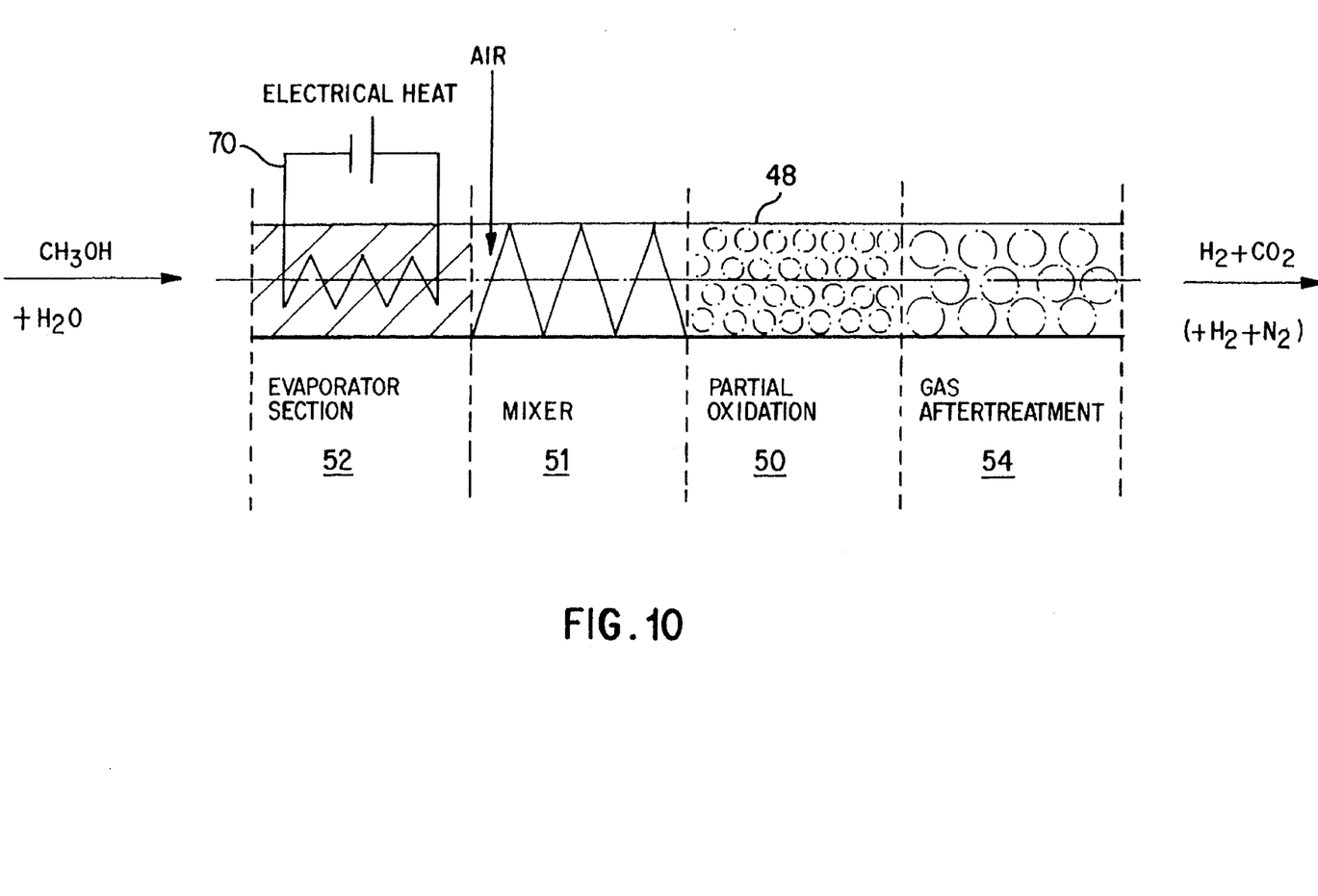
FIG. 10 shows a reactor for performing partial oxidation from methanol.

Partial Oxidation of Methanol (FIGS. 9 and 10)

FIG. 9 shows the process of partial oxidation of methanol. Initially, a water-methanol mixture is supplied from a tank 58, preferably with a molar ratio of methanol to water of 1:0 to 1:2. The tank 58 in this case can be at ambient pressure. Delivery is by means of a pump 60 which may assume the metering function directly as a function of load by means of a suitable control, for example rpm regulation. Alternatively, the liquids can be delivered through a constantly operating pump, with subsequent metering being performed for example by solenoid valves comparable to the injection valves in a motor vehicle. Then, the water-methanol mixture is evaporated 62. Air is fed to the vapor mixture through a compressor 64, for example, a diaphragm pump, and the mixture is admitted to the reactor 66. In the reactor, the exothermal conversion to hydrogen and $CO_2$ and $H_2$ takes place on a catalyst. Advantageously, the CO component of the product gas can then be reduced in a subsequent reactor stage 68 and/or the hydrogen yield can be increased, for example, by means of the known shift reaction:

$$CO + H_2O \rightarrow H_2 + CO_2.$$

As in the process described above for water vapor reformation, water and methanol can be used instead, stored as a mixture in the same tank, or they can be stored separately from one another in different tanks and be delivered from them. The water can also be supplied advantageously only after partial oxidation. This has the advantage that the CO content is additionally reduced.

FIG. 10 shows a practical embodiment of a reactor for performing partial oxidation of methanol. Similarly to FIG. 8, it is in the form of a tube whose inside diameter is preferably 5 to 50 mm.

Once again the main reaction stage 50 is located in the center, together with the catalyst on which partial oxidation takes place. In the tubular reactor, connected upstream from the main reaction stage, an evaporator stage 52 is located that is heated by an electrical heater 70. Instead of or in addition to this heating, a feed device can be provided with which the hot product gases that are produced during partial oxidation on the catalyst can be supplied for example in a countercurrent on the outside wall of the reactor.

Between the evaporator stage 52 and the main reaction stage 50 is a mixing stage 51 in which the methanol-water mixture in vapor form is mixed with air admitted from the outside and conducted into the reforming stage. The reforming stage is followed by a gas aftertreatment stage 54 in which further reaction of the remaining methanol with water vapor takes place and/or the resultant CO is reduced with water vapor in a shift reaction. This stage is heated only slightly, if at all, so that the corresponding heating is not shown here.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for reducing nitrogen oxides in a motor vehicle exhaust by reduction on a catalyst, the method comprising the steps of:
    generating hydrogen required for nitrogen reduction on-board the motor vehicle via electrolysis; and
    performing said electrolysis using a liquid fixed electrolyte.

2. The method according to claim 1, wherein an educt for said electrolysis is an aqueous solution.

3. The method according to claim 2, further comprising the step of guiding said aqueous solution in a circuit.

4. The method according to claim 3, wherein a supply container is located in said circuit.

5. The method according to claim 4, further comprising the step of topping-off said supply container with water at zero pressure.

6. The method according to claim 5, wherein said water used for topping-off said supply container is of tap water quality.

7. The method according to claim 3, further comprising the steps of:
    obtaining water from a water-vapor-laden exhaust from said motor vehicle; and
    feeding said water into said circuit for said aqueous solution.

8. The method according to claim 1, further comprising the step of supplying water as an educt for said electrolysis from a water-vapor-laden gas circuit to an electrolyzer.

9. The method according to claim 1, further comprising the step of performing said electrolysis at variable pressure.

10. The method according to claim 1, further comprising the step of performing said electrolysis without active cooling.

11. The method according to claim 1, further comprising the step of additionally producing hydrogen required for the nitrogen reduction by at least one of water vapor reformation and partial oxidation of hydrocarbons.

12. The method according to claim 11, wherein said hydrocarbons are one of methanol, diesel fuel, and gasoline.

13. A device for reducing nitrogen oxides in motor vehicle exhaust via catalytic reduction, comprising:

a reactor in which a catalyst is contained, nitrogen oxide reduction being performed on said catalyst with the addition of hydrogen;

at least one electrolyzer for generating hydrogen on-board said motor vehicle, wherein said electrolyzer includes an electrolyte having a liquid fixed electrolyte.

14. The device according to claim 13, further comprising at least one of a first reactor for water vapor reformation from hydrocarbons and a second reactor for partial oxidation of hydrocarbons for generating hydrogen.

15. A method for reducing nitrogen oxides in a motor vehicle exhaust by reduction on a catalyst, the method comprising the steps of:

generating hydrogen via electrolysis using a liquid fixed electrolyte on board the motor vehicle; and independently performing nitrogen reduction on-board the motor vehicle using said generated hydrogen.

16. A device for reducing nitrogen oxides in motor vehicle exhaust via catalytic reduction, comprising:

a reactor in which a catalyst is contained, nitrogen oxide reduction being performed on said catalyst; and at least one electrolyzer for separately generating hydrogen on-board said motor vehicle apart from the reactor, wherein said electrolyzer includes an electrolyte having a liquid fixed electrolyte, and wherein said hydrogen is coupled with said reactor to perform said nitrogen oxide reduction.

* * * * *